[11] 3,588,716

| [72] | Inventors | Elbert L. Turner<br>San Jose;<br>James P. Rapoza, Santa Clara; Claude A. Jackman, San Jose, Calif. |
|---|---|---|
| [21] | Appl. No. | 851,590 |
| [22] | Filed | Aug. 20, 1969 |
| [45] | Patented | June 28, 1971 |
| [73] | Assignee | Sylvania Electric Products, Inc. |

[54] METHOD AND APPARATUS FOR DETECTING WHEN THE SPECTRUM OF A PULSE SIGNAL IS CENTERED IN THE PASSBAND OF A RECEIVER
9 Claims, 6 Drawing Figs.

[52] U.S. Cl. .................................................. 328/167,
328/138, 324/77, 331/19, 343/100, 325/335
[51] Int. Cl. ........................................................ H03b 1/00
[50] Field of Search ............................................. 324/77 (D),
77 (E), 77 (F), (Inquired); 325/332, 335, 467,
468, 469, (Inquired); 343/100—12, (Inquired);
328/138, 165, 167; 331/19

[56] References Cited
UNITED STATES PATENTS

| 3,003,117 | 10/1961 | Stavis | 324/77X |
| 3,155,919 | 11/1964 | Baxter et al. | 331/19 |
| 3,156,867 | 11/1964 | Whitwell et al. | 325/332X |
| 3,230,451 | 1/1966 | Hilliard | 325/332X |
| 3,290,684 | 12/1966 | Renn et al. | 343/100 |
| 3,418,574 | 12/1968 | Wyckoff | 324/77 |

*Primary Examiner*—John S. Heyman
*Attorneys*—Norman J. O'Malley, Russell A. Cannon and John F. Lawler

ABSTRACT: This system comprises the series combination of a first band-pass filter and a wide band limiter each having a bandwidth sufficiently broad to pass several secondary lobes of the spectrum of an input pulse, and a second band-pass filter having a passband that is centered in the limiter passband and is broad enough to pass only one secondary lobe of the pulse spectrum. The output signal of the second filter is detected and applied to a threshold device. The limiter normalizes the amplitude of the strongest lobe in the passband thereof to be a limiting level that is greater than a prescribed threshold level. When the amplitude of the second filter output signal exceeds the threshold level, the output signal of the threshold detector indicates that the center frequency of the input pulse is centered in the passband of the limiter.

Patented June 28, 1971

INVENTORS
ELBERT L. TURNER
JAMES P. RAPOZA
CLAUDE A. JACKMAN

BY *Russell A. Cannor*

AGENT

Patented June 28, 1971

INVENTORS
ELBERT L. TURNER
JAMES P. RAPOZA
CLAUDE A. JACKMAN

BY *Russell A. Cannon*

AGENT

METHOD AND APPARATUS FOR DETECTING WHEN THE SPECTRUM OF A PULSE SIGNAL IS CENTERED IN THE PASSBAND OF A RECEIVER

BACKGROUND OF INVENTION

This invention relates to search and lock-on receivers and more particularly to circuitry for detecting when the frequency spectrum of a pulse signal is centered in the passband of receiver circuitry.

The frequency spectrum of a pulse of a train of radio frequency RF pulses is represented by the illustration in FIG. 1. The pulse spectrum comprises a sinusoidally varying signal component 2 having a center frequency $f_c$ and a plurality of sinusoidally varying signal components 3 having frequencies that are harmonics of the pulse repetition frequency of the pulse train. Thus, the spectral components comprising the pulse are spaced apart by 1/T, where T is the period of the pulse repetition frequency. The amplitudes and phases of the signal components define an envelope curve 4 which varies according to the function $\sin(x)/x$ for pulses having zero rise and fall times. This function is symmetrical about the RF carrier frequency $f_c$ and falls off to zero amplitude at harmonics of $1/t_o$, where $t_o$ is the width of the pulse. Each of the lobes in FIG. 1 comprises a finite amount of energy. As used hereinafter, the lobe centered about the carrier or center frequency $f_c$ is referred to as the primary lobe and the other lobes are referred to as secondary lobes.

It is desirable to be able to detect and lock onto an input pulse signal only when it is centered in the passband of the receiver. A receiving system comprising a filter having a passband that is narrow compared to the spectral width of several lobes of the signal followed by a threshold detector is commonly used in attempting to lock the receiving system onto the received signal. This technique is subject to an erroneous lock-up when detecting pulse signals, however, since a secondary lobe of the pulse spectrum containing enough energy to exceed the threshold level may be centered in the filter passband. This will cause the receiver to incorrectly lock onto the frequency of a secondary lobe which may be several hundred megahertz from the center frequency of the pulse spectrum.

SUMMARY OF INVENTION

An object of this invention is the provision of an improved circuit for detecting when the center frequency of a pulse signal spectrum is centered in the passband of receiver circuitry.

Briefly, a limiter having a frequency passband sufficiently broad to pass several secondary lobes of the frequency spectrum of an input pulse normalizes the amplitudes of the signal lobes at the limiter output. The output signal of the limiter is filtered by a filter having a narrow passband centered in the limiter passband and broad enough to pass only one of the secondary lobes. The normalized signal passed by the limiter and filter will exceed the threshold level only when the pulse signal is centered in the limiter passband.

DESCRIPTION OF PREFERRED EMBODIMENT

Figure 2:
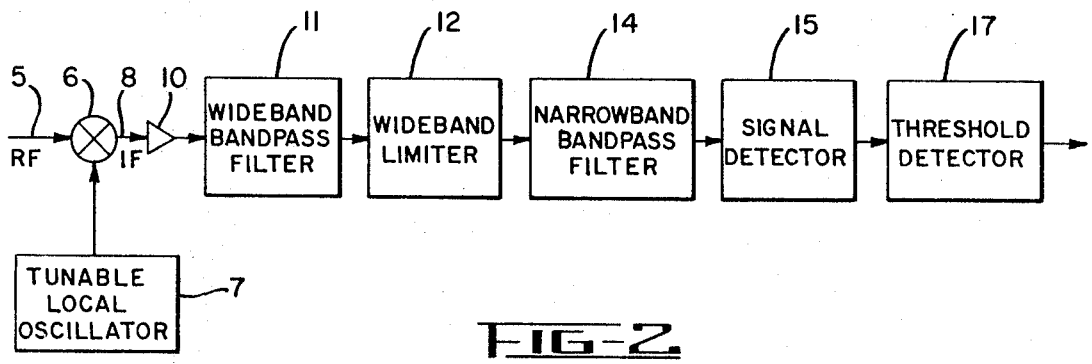
FIG. 2 is a block diagram of a system embodying this invention.

Referring now to FIG. 2, an RF pulse signal on line 5 is combined in mixer 6 with a local oscillator signal from source 7 to produce an intermediate frequency IF signal on line 8. The local oscillator signal source 7 is tunable in order to provide a constant frequency IF signal on line 8 for signals of differing input frequency. The IF signal is applied to a receiving system comprising the series combination of wide band amplifier 10, wide band passband filter 11, wide band limiter 12, narrowband passband filter 14, signal detector 15, and threshold detector 17. The object of the receiving system of FIG. 2 is to cause signal detector 15 to produce an output voltage which is greater than the threshold level of detector 17 only when the center frequency of the primary lobe of the spectrum of an incident pulse signal is centered in the passband of limiter 12.

Amplifier 10 is employed to increase the amplitude of the weakest received signal of interest to be greater than the limiting level $V_{LL}$ of limiter 12.

In automatic search and lock-on receivers having high dynamic range and sensitivity it may be desirable to provide a high degree of selectivity prior to processing of a received signal. In such applications a filter 11 is employed which has a passband centered at the IF frequency and broad enough to pass several secondary lobes of an incident pulse. Filter 11 therefore limits the number of spectral components and secondary lobes comprising an incident pulse signal that are passed to the limiter.

Figure 1:
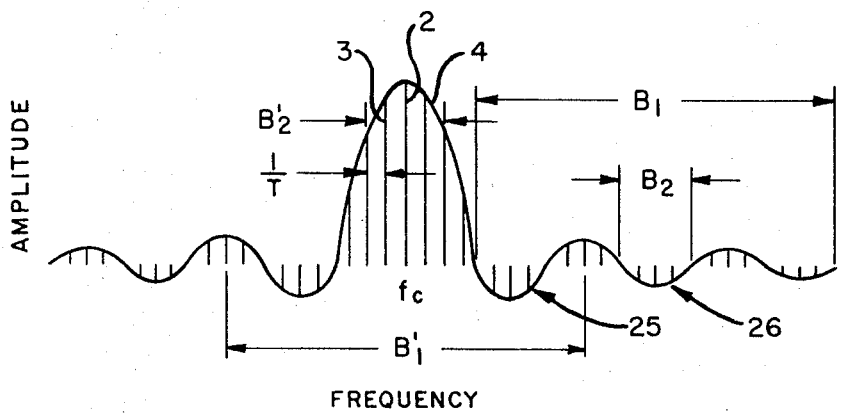
FIG. 1 is a graphic representation of the frequency spectrum of one pulse of a train of pulses.

Limiter 12 is a conventional wide band limiter that has a frequency passband sufficiently broad to pass several secondary lobes of an incident pulse signal having the narrowest pulse width that is to be detected. In practice, the width $B_1$ of the limiter passband may be five times the reciprocal of the width of the narrowest pulse to be detected as illustrated in FIG. 1. This broad bandwidth is necessary to provide a detectable difference in the amplitudes of secondary lobes at the center and edges of the limiter passband. By way of example, limiter 12 may be a limiter circuit such as is described in Electronic Designer's Handbook, Section 12–5; R. Landee, D. Davis, and A. Albrecht, McGraw-Hill Book Co., Inc.; 1957.

The limiter normalizes the amplitudes of the signals (and thus the relative energy in the secondary lobes) that are in the limiter passband $B_1$ with respect to the strongest signal in the limiter passband. Thus, the strongest signal component in the limiter input signal always has an amplitude in the limiter output signal that is equal to the limiting level $V_{LL}$. Weaker signal components in the limiter input signal will produce output signals that are proportionally weaker than the limiting level. More specifically, if a number of signals having different frequencies and amplitudes are applied to the limiter, the gain of the limiter for all of the signals is controlled by the strongest input signal component in the limiter.

Figure 5:
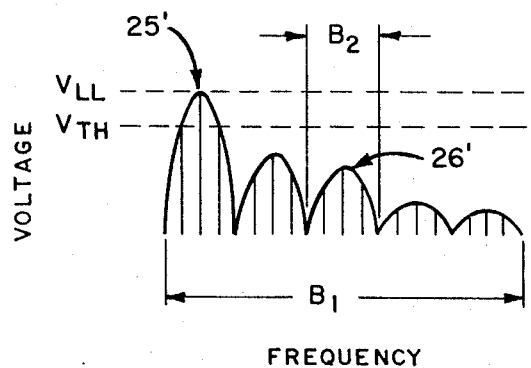
FIGS. 5 and 6 are graphic representations of portions of the spectrum of a pulse signal which are useful in explaining the operation of this invention.
Figure 3:
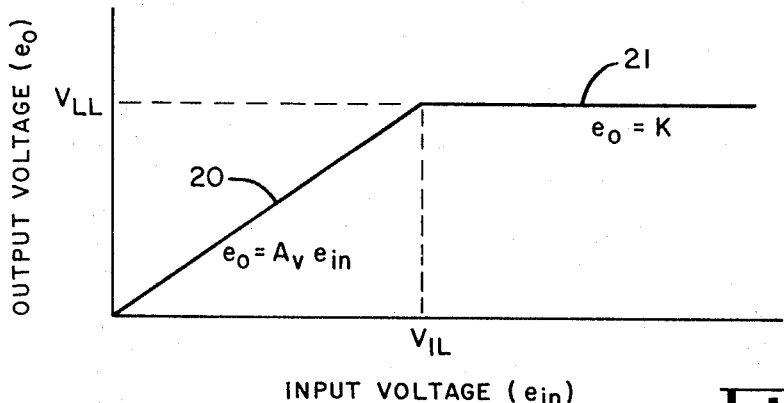
FIGS. 3 and 4 are curves representing the transfer characteristics of the limiter of the system of FIG. 1.
Figure 4:
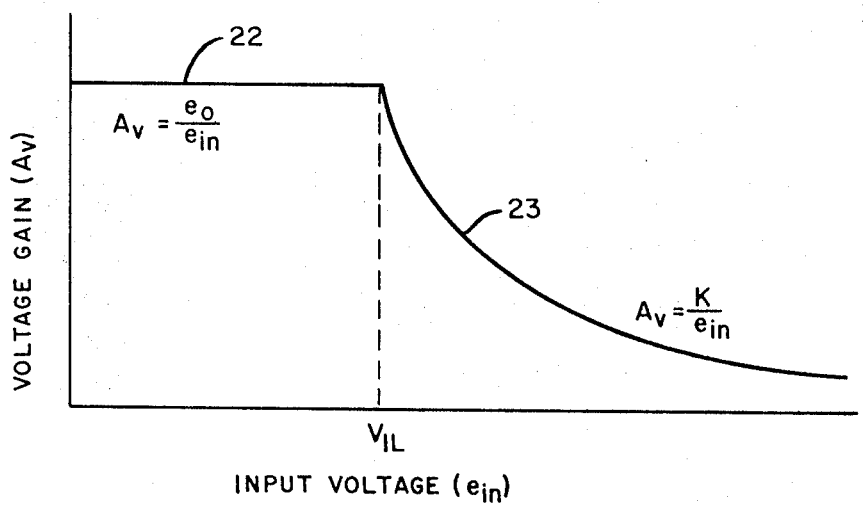

This operation of the limiter will now be explained in more detail with respect to the limiter transfer characteristics represented by the curves in FIGS. 3 and 4. The output voltage $e_o$ of the limiter is equal to the product of the limiter voltage gain $A_v$ and input voltage $e_{in}$ when the input signal is less than the input limiting voltage $V_{IL}$. This operation is represented by curve 20 in FIG. 3. The limiter output voltage is a constant K equal to the limiting level voltage $V_{LL}$ when the input signal is greater than the input limiting voltage $V_{IL}$. This operation is represented by curve 21 in FIG. 3. The limiter voltage gain $A_v$ is equal to the ratio between the output voltage $e_o$ to the input voltage $e_{in}$ and is constant when the amplitude of the input signal is less than the input limiting voltage, see curve 22 in FIG. 4. When the amplitude of the input signal is greater than the input limiting voltage, however, the voltage gain is controlled by and is inversely proportional to the amplitude of the input voltage, see curve 23 in FIG. 4. The input signal controlling the limiter gain is the composite of all components of the input signal. If one of the components is larger than the other components it will dominate the gain control and all of the other signal components will be normalized with respect to it and will be proportionally lower in output amplitude. Thus, all of the frequency components that are applied to the limiter and are within the passband thereof appear in the limiter output signal with their relative power ratios preserved and normalized with respect to the limiting level. This operation may be seen by comparing the graphic representations in FIGS. 1, 5 and 6.

The passband $B_2$ of filter 14 is centered in the passband $B_1$ of the limiter and has a width that is narrow compared to the limiter bandwidth (see FIG. 1). Typically, the passband of filter 14 will pass only one secondary lobe of a pulse signal having the narrowest expected pulse width. Filter 14 passes a signal having a maximum amplitude only when the strongest signal component in the limiter output signal has a frequency centered in the passbands of both limiter 12 and filter 14. This occurs only when the spectrum of a received pulse signal is centered in the limiter passband. Due to the symmetry of a pulse spectrum, there are signal components within the limiter passband having amplitudes that are larger than the center frequency component in the limiter passband for all other conditions. The operation of the system will now be described in relation to the graphic representations in FIGS. 1, 5 and 6. Consider that an incident pulse signal having a center frequency $f_c$ that is outside of the passband $B_1$ of limiter 12 (see FIG. 1) is received by the system. The primary lobe 4 is outside of the passband of limiter 12 and does not affect the operation of the limiter. The secondary lobe 25 which is adjacent to the lower frequency edge of the limiter passband has the largest amplitude in the passband $B_1$. The amplitudes of the secondary lobes in the limiter passband are therefore normalized with respect to the amplitude of secondary lobe 25. The amplitude of the corresponding secondary lobe 25' in the limiter output signal (see FIG. 5) is therefore equal to the limiting level $V_{LL}$. Since the limiter passband $B_1$ is broad, however, the amplitude of the secondary lobe 26' in the limiter output signal and centered in the passband $B_2$ of filter 14 is less than the threshold level $V_{TH}$. Thus, the amplitude of the output signal of detector 15 is less than the threshold level $V_{TH}$. The output signal of threshold detector 17 therefore indicates that the center frequency of the incident pulse signal is not centered in the receiver-limiter passband.

Figure 6:
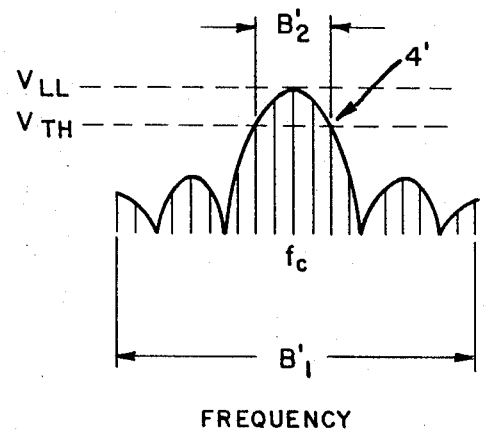

As the receiver is tuned by varying the frequency of the local oscillator, the center frequency and primary lobe of the pulse moves into the passband $B_1$ of the limiter until the primary lobe 4 is centered in the passbands $B'_1$ and $B'_2$ of the limiter and filter 14, respectively, as illustrated in FIGS. 1 and 6. The limiter normalizes the secondary lobes in the limiter passband $B'_1$ with respect to the amplitude of the primary lobe 4 as illustrated in FIG. 6. Since the normalized primary lobe 4' is within the passband $B'_2$ of filter 14, the output signal of detector 15 is greater than the threshold level $V_{TH}$. The threshold detector therefore produces an output signal indicating that the center frequency of the incident pulse signal is centered in the receiver-limiter passband.

We claim:

1. The method of indicating when the spectrum of an incident pulse signal is centered in a first frequency band comprising the steps of:

normalizing the amplitudes of signal components of the pulse signal having frequencies in said first frequency band with respect to a reference level that is greater than a threshold level; and producing an output signal indicating that the spectrum of the pulse signal is centered in said first band when the amplitude of one of said normalized signal components having a frequency within a second frequency band, said second band being centered in said first band and having a width less than the width of said first band, is greater than the threshold level.

2. The method according to claim 1 wherein the width of said second band is broad enough to pass one secondary lobe of the pulse signal and the width of said first band is greater than three times the width of said second band.

3. The method according to claim 2 including prior to normalizing the step of passing only signal components of the pulse signal having frequencies in the first frequency band.

4. The method according to claim 2 including prior to normalizing, the step of increasing the magnitudes of all incident pulse signals of interest to be at least equal to the reference level.

5. Apparatus for indicating when the spectrum of an incident pulse signal is centered in a first frequency band comprising:

means for normalizing the amplitudes of spectral components of the incident pulse signal having frequencies that are within said first frequency band with respect to a limiting level greater than a prescribed threshold level; and means producing an output signal having a first value when a normalized signal component has an amplitude greater than the threshold level and has a frequency within a second frequency band, said second band being centered in said first band and having a width less than the width of said first band, for indicating that the spectrum of the pulse signal is centered in said first band; and producing an output signal having a second value when the amplitude of the normalized signal components in said second band are less than the threshold level for indicating that the spectrum of the pulse signal is not centered in said first frequency band.

6. Apparatus according to claim 5 wherein said second frequency band has a width broad enough to pass one secondary lobe of the pulse signal and said first frequency band has a width at least four times the width of said second frequency band.

7. Apparatus according to claim 6 wherein said last-named means comprises a filter having a narrow frequency passband corresponding to said second frequency band and a threshold circuit responsive to the output of said filter.

8. Apparatus according to claim 6 wherein said normalizing means comprises a limiter having a broad frequency passband corresponding to said first frequency band.

9. Apparatus according to claim 7 including an amplifier for increasing the amplitude of all incident pulse signals of interest to be at least equal to the limiting level, said limiter being responsive to the output of said amplifier.